United States Patent
Rietze et al.

(10) Patent No.: US 7,457,127 B2
(45) Date of Patent: Nov. 25, 2008

(54) COMMON BOOT ENVIRONMENT FOR A MODULAR SERVER SYSTEM

(75) Inventors: Paul D. Rietze, Portland, OR (US); Bob Whitcombe, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 10/456,459

(22) Filed: Jun. 5, 2003

(65) Prior Publication Data

US 2003/0210522 A1 Nov. 13, 2003

Related U.S. Application Data

(62) Division of application No. 10/086,410, filed on Nov. 20, 2001, now Pat. No. 6,904,482.

(51) Int. Cl.
 *H05K 7/00* (2006.01)
(52) U.S. Cl. ...................... 361/728; 361/715
(58) Field of Classification Search ................ 361/728, 361/818, 815, 715, 685–686, 683, 788; 710/685, 710/100, 101, 102, 300, 1, 107, 37; 717/174; 711/114, 173, 111, 156, 141; 713/220, 222
See application file for complete search history.

(56) References Cited

U.S. PATENT DOCUMENTS

| | | | |
|---|---|---|---|
| 5,291,479 A * | 3/1994 | Vaziri et al. ................. 370/264 |
| 5,835,735 A | 11/1998 | Mason et al. | |
| 5,971,804 A | 10/1999 | Gallagher et al. | |
| 6,016,252 A * | 1/2000 | Pignolet et al. ............. 361/724 |
| 6,157,534 A | 12/2000 | Gallagher et al. | |
| 6,178,503 B1 * | 1/2001 | Madden et al. ................ 713/2 |
| 6,325,636 B1 * | 12/2001 | Hipp et al. .................... 439/61 |
| 6,389,499 B1 * | 5/2002 | Frank et al. ................. 710/300 |
| 6,392,884 B1 * | 5/2002 | Chou ........................ 361/687 |
| 6,411,506 B1 * | 6/2002 | Hipp et al. .................. 361/686 |
| 6,483,107 B1 * | 11/2002 | Rabinovitz et al. .......... 250/239 |
| 6,532,538 B1 | 3/2003 | Cronk et al. | |
| 6,536,669 B2 | 3/2003 | Memmott | |
| 6,747,878 B1 | 6/2004 | Hipp et al. | |
| 6,810,398 B2 * | 10/2004 | Moulton ........................ 707/6 |
| 6,928,578 B2 * | 8/2005 | Archibald et al. .............. 714/6 |
| 6,993,677 B1 * | 1/2006 | Wilner ......................... 714/6 |
| 2001/0011314 A1 | 8/2001 | Gallagher et al. | |
| 2002/0094706 A1 * | 7/2002 | Britton et al. ................ 439/74 |
| 2003/0090878 A1 | 5/2003 | Merkin | |

(Continued)

FOREIGN PATENT DOCUMENTS

EP 1 126 369 A2 8/2001

(Continued)

OTHER PUBLICATIONS

Rabinovitz, Enclosure for computer peripheral devices, Pub. date: Dec. 26, 2002.*

(Continued)

*Primary Examiner*—Hung S Bui
(74) *Attorney, Agent, or Firm*—Kacvinsky LLC

(57) ABSTRACT

A method and apparatus to provision a plurality of server blades from a modular server system with operating system software is described.

5 Claims, 5 Drawing Sheets

U.S. PATENT DOCUMENTS

2003/0167439 A1 * 9/2003 Talagala et al. ............. 714/770

FOREIGN PATENT DOCUMENTS

WO     WO 01/50708 A2    7/2001

OTHER PUBLICATIONS

M. Buddhikot et al., "Design of a large scale multimedia storage server," Computer Networks & ISDN Systems, vol. 27, No. 3, Dec. 1, 1994, pp. 503-517, North Holland Publishing, Amsterdam, NL.

Deni Connor, "Vendors Pack Punch Into Small Servers," Network World, pp. 1-2, May 14, 2001, Retrieved from <networkworld.com/archive/2001/120650_05-14-2001>.

* cited by examiner

COMMON BOOT ENVIRONMENT FOR A MODULAR SERVER SYSTEM

The present patent application is a Divisional of application Ser. No. 10/086,410, filed Nov. 20, 2001 now U.S. Pat. No. 6,904,482.

BACKGROUND

Modular server systems are increasing being deployed in computer data centers. As the demand for Internet services increase so does the need for more hardware and software infrastructure to provide such services. This infrastructure may typically be implemented using servers. Some data centers may have thousands of servers, which may consume a significant amount of physical space. Modular server systems provide a way to reduce space requirements, as well as provide other advantages such as lower maintenance and upgrade costs, improved interoperability between servers and increased reliability. As a result, there may be a substantial need for improvements to modular server systems to decrease space requirements and improve other modular server advantages.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
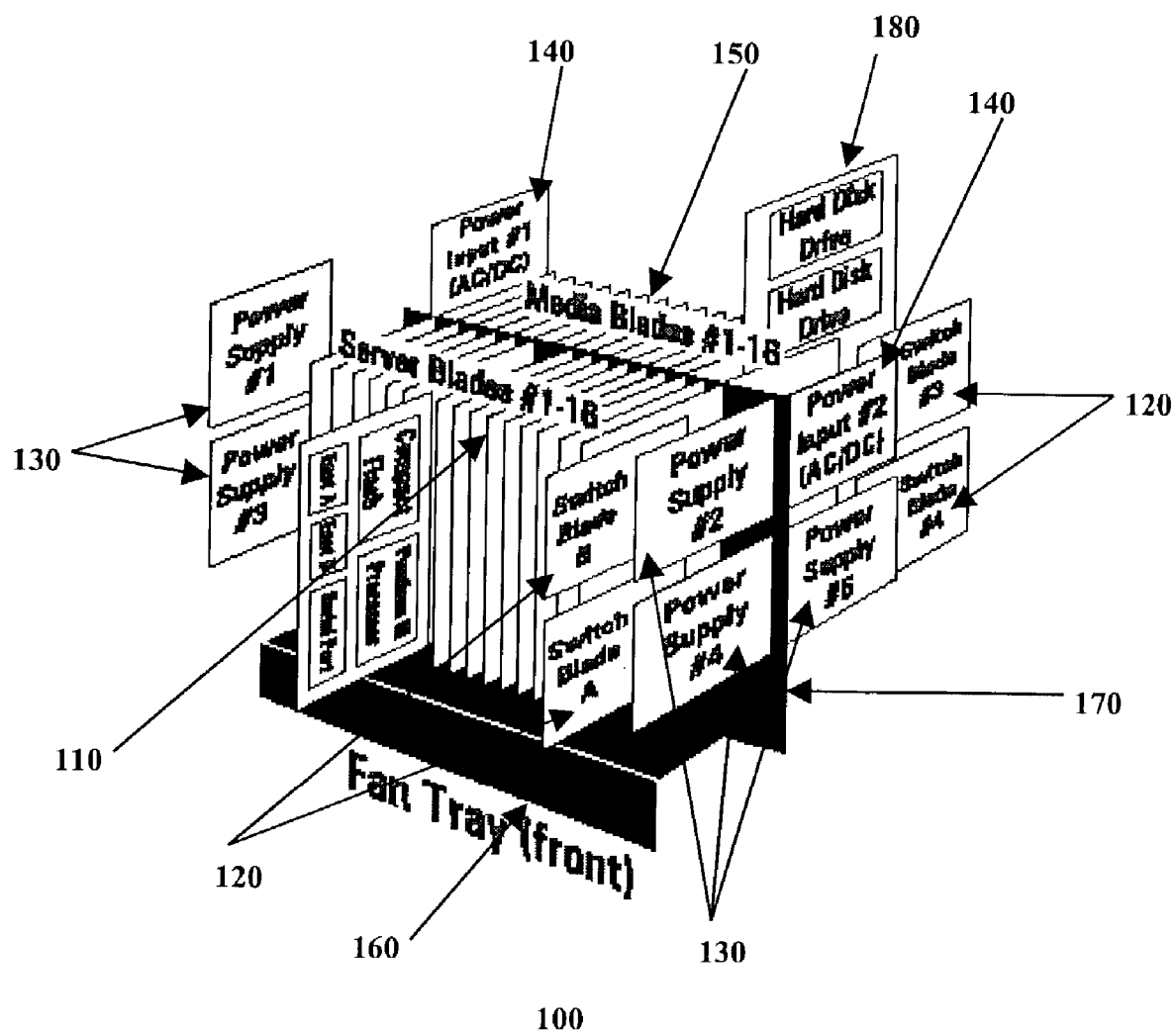
FIG. 1 illustrates a modular server system according to an embodiment of the present invention.

Embodiments of the invention may comprise a method and apparatus to provide a common boot environment for a modular server system. One embodiment of the invention may include a storage system for a modular server system. The storage system may comprise, for example, a redundant array of independent discs (RAID) system. Operating System (OS) software for a plurality of server blades may be stored by the RAID system. The storage system may be implemented as part of the modular server system chassis, midplane or a dedicated storage blade. In one embodiment of the invention, the storage system may be implemented external to the modular server system, such as part of a Storage Area Network (SAN) or Network Access Storage (NAS) with a high-speed connection to the modular server system. Whenever any server blade needs access to its OS, it may receive the OS from the RAID system. A server blade may need access to its OS for any number of reasons, such as during initial startup, or after an upgrade, failure, maintenance, reboot and so forth.

One embodiment of the invention may improve OS boot performance by decreasing the number of storage systems or hard disk drives used to provision the server blades. By way of contrast, conventional modular server systems typically have a storage system for each server blade. An example of a conventional storage system may include a hard disk drive and hard disk drive controller. The storage system may store an OS for the server blade. Upon receiving a boot or reboot command, each server blade may use the dedicated storage system to load its OS. One embodiment of the invention may reduce the number of storage systems needed to provision the server blades of a modular server system with the appropriate OS. In addition to improved OS boot performance, this may also reduce repair, upgrade and equipment costs for modular server systems.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 illustrates a modular server system according to an embodiment of the present invention. FIG. 1 illustrates a modular server system 100 that may comprise server blades 110, switch blades 120, power supplies 130, power inputs 140, media blades 150, a fan tray 160, a midplane 170 and a storage blade 180. The term "blade" as used herein may refer to a device implemented as a single board, such as a single board computer (SBC) with a processor or controller, a router, a switch, a storage system, a network appliance, a private branch exchange, an application server, a computer/telephony (CT) appliance, and so forth. Media blades 150 are blades that may accommodate media devices, such as a graphics processing device, an audio processing device, a streaming media processing device, a mass storage system, and so forth. Storage blade 180 may be one example of a media blade 150.

Modular server system 100 may be configured to hold up to sixteen independent server blades 110, along with up to sixteen media blades 150 or storage blades 180. Any other number of server blades 110, media blades 150 or storage blades 180, however, may also be supported. Each blade may include an interface to connect with midplane 170, and may communicate with other blades via midplane 170. It may be appreciated that although server blades 110 and media blades 150 including storage blade 180 are shown in FIG. 1 connected to the midplane 170 at opposite sides, the embodiments of the invention are not limited in this context. For example, storage blade 180 may be positioned on the same side of server blades 110, if desired.

Midplane 170 may be, for example, a communications circuit board having a plurality of blade interfaces. Each blade interface may provide a common interconnect for modules connected thereto. In one embodiment of the invention, the blade interfaces are in electrical communication with each other and with the system management bus of midplane 170. In one embodiment of the invention, midplane 170 may be based on a form factor as set forth by the Peripheral Component Interconnect (PCI) Industrial Computer Manufacturers Group (PICMG) CompactPCI specification version 2.1 ("CompactPCI Specification"), wherein the blade interfaces are CompactPCI slots or connectors. The CompactPCI Specification may include the Eurocard form factor popularized by the "Versa Module Europa" (VME) bus having standard Eurocard dimensions and high-density 2 mm pin-and-socket connectors.

All blades connected to midplane 170 may communicate with other blades and system resources via midplane 170. Each blade is essentially a network node with a network address. Therefore, each blade may create a network connection with another blade or system resource to communicate information. For example, in one embodiment of the invention the connection may be an Ethernet connection, such as a Fast Ethernet or Gigabit Ethernet connection.

Modular server system 100 may also be configured to support up to four switch blades 120 to perform network switching and provide N+1 redundancy. In one embodiment of the invention, switch blades 120 may have up to twenty 10/100 Base-T auto-negotiating ports and support 4,096 Media Access Controller (MAC) addresses. Sixteen of the twenty ports may be assigned, for example, to Ethernet channels from midplane 170, which may in turn be connected to sixteen server blades 110. The remaining four ports may be accessible, for example, through RJ-45 (Ethernet) connectors on a face plate for switch blade 120. Other configurations may be implemented, however, depending on the number of server blades 110 supported by modular server system 100. Data packets may be buffered in switch blades 120 to reduce Ethernet collisions for a particular channel, and a full managed layer 3 or layer 4 switch may be implemented to provide quality of service (QoS) control. In one embodiment of the invention, a non-blocking switch fabric with sufficient bandwidth to reduce packet loss may be desired.

In the modular server system 100 illustrated in FIG. 1, up to six load sharing power supplies 130 may be connected to the midplane 170 to provide power to the modules of the server system 100. These power supplies 130 may provide 150 watts of power each, for example, and may provide for N+1 redundancy as well. Up to two power alternate current (AC)/direct current (DC) inputs 140 may be connected to midplane 170 to provide input power to modular server system 100. A removable fan tray with cooling fans 160 may be utilized to provide cooling air flow within the modular server system 100 to cool the modules therein. According to an embodiment of the present invention, the removable fan tray 160 may include up to six fans for N+1 redundancy.

Figure 2:
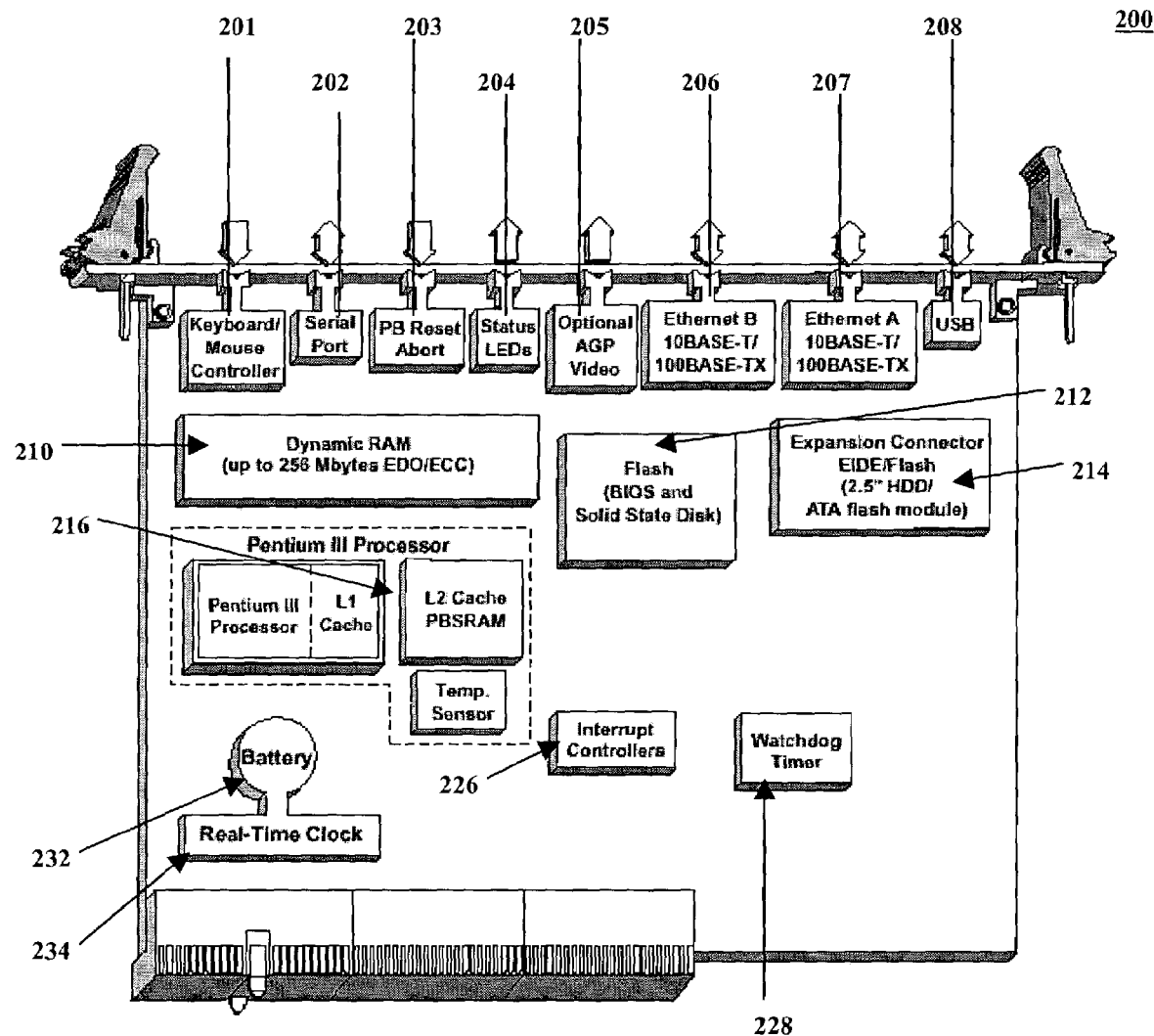
FIG. 2 illustrates a server blade in accordance with an embodiment of the present invention.

FIG. 2 illustrates a server blade according to an embodiment of the present invention. FIG. 2 illustrates a server blade 200 designed to work as a modular component of the server system 100. Server blade 200 may represent, for example, a server blade 110. In one embodiment of the invention, server blade 200 may be designed in accordance with the CompactPCI Specification. It may be appreciated, however, that any suitable interface standard may be utilized and still fall within the scope of the invention.

Server blade 200 may include a processor 216, such as a Pentium® III processor module made by Intel Corporation. The Pentium III processor module may contain a power supply for the processor's unique voltage requirements, a temperature sensor, a system memory (L2 cache), and core logic required to bridge the processor to the standard system buses. In one embodiment of the present invention, server blade 200 may incorporate a system management bus. The system management bus may be in communication with, for example, the system management bus of midplane 170. This may provide access to the OS functions of storage blade 180.

Server blade 200 may also include network interfaces 206 and 207. According to the embodiment shown in FIG. 2, dual Ethernet ports 206 and 207 are provided. The Ethernet interfaces 206 and 207 may utilize, for example, the Ethernet Express Pro 100 compatible, Intel 82559 Fast Ethernet Multifunction PCI Controller, made by Intel Corporation ("82559 Controller"). The 82559 Controller may include both a Media Access Controller (MAC) and a physical layer (PHY) interface combined into a single component solution. The network interfaces 206 and 207 may be, for example, RJ-45 connectors on the faceplate of server blade 200. The faceplate may also include status light emitting diodes (LED) 204 to indicate the status of each channel.

Server blade 200 may use semiconductor memory 210 for local memory. An example of semiconductor memory 210 may include a synchronous dynamic random access memory (SDRAM) dual-inline memory module (DIMM). In one embodiment of the invention, the SDRAM may be error correcting coded (ECC). ECC memory may correct single bit errors and report multiple bit errors to the OS. Server blade 200 may also provide on-board flash memory 212 for storing the system basic input/output system (BIOS), and for use as a solid-state disk. A battery-backed static random access memory (SRAM) may also be provided for this use as well.

Server blade 200 may also include interrupt controllers 226 to provide support for level-triggered and edge-triggered inputs, individual input masking, and fixed and rotating priorities. A push-button reset/abort button 203 may also be provided to allow a user to reset server blade 200. A keyboard/mouse connector 201 may allow a user to connect a keyboard or mouse to the server blade 200 for interaction therewith. Optionally, a video output plug 205, such as a video graphics array (VGA) connector, may be provided to allow connection to a monitor for video output. A universal serial bus (USB)

connector 208 may also be provided to allow server blade 200 to connect to other devices, such as portable optical disc drives, hard disk drives, and so forth.

The server blade 200 may also include a serial port 202, such as a 16C550 PC-compatible serial port, on the front panel. A real-time clock 234 with battery power 232 is preferably provided on the server blade 200 to perform timekeeping functions, such as alarm, maskable periodic interrupt, and calendaring. A watchdog timer 528 may be optionally provided to monitor system operation and to be programmable for a number of timeout periods. A two-stage watchdog timer may be utilized, that is, it may produce a non-maskable interrupt (NMI) before it generates a Reset Request. Therefore, failure to strobe the watchdog timer within the programmed time period may result in an NMI, a Reset Request, or both. A register is set if the watchdog timer caused the reset event. This watchdog timer is cleared only on power-up, enabling system software to take appropriate action on reboot. An input/output expansion connector 214 may be provided in server blade 200 to allow expansion for interfacing with a storage medium, flash memory, etc.

Figure 3:
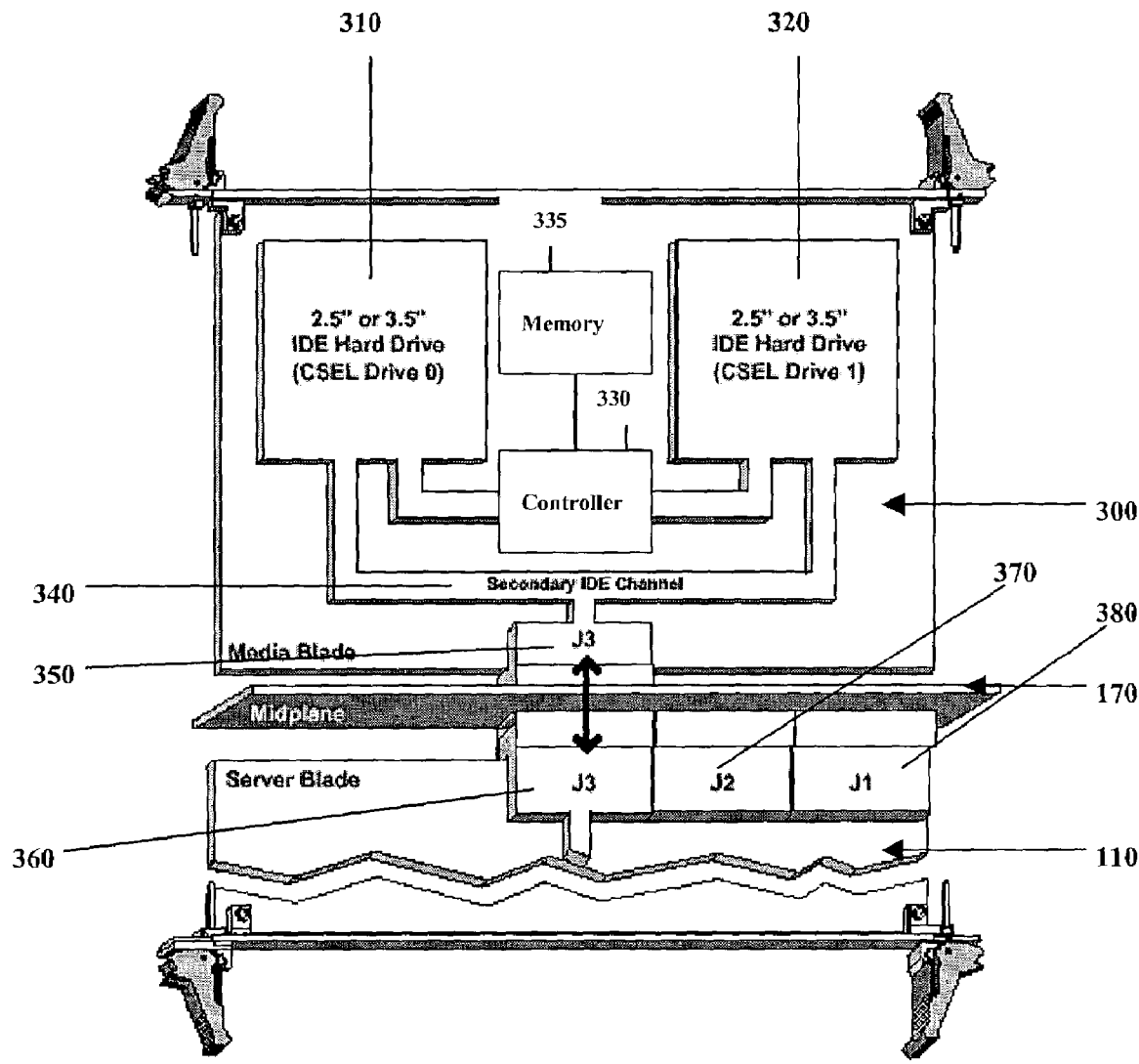
FIG. 3 illustrates a storage blade having a connection with server blades via a midplane in accordance with an embodiment of the present invention.

FIG. 3 illustrates a storage blade having a connection with a server blade via a midplane according to an embodiment of the present invention. FLG. 3 illustrates a storage blade 300 that may represent, for example, storage blade 180. In one embodiment of the invention, storage blade 300 may be a modular component of a modular server system, such as modular server system 100. Storage blade 300 may be configured to carry a mass storage medium device such as a hard disk drive and/or compact disc read-only memory (CD-ROM). FIG. 3 illustrates two 2.5 inch or 3.5 inch Integrated Drive Electronics (IDE) hard disk drives 310 and 320. It can be appreciated, however, that storage blade 300 may support any number or type of conventional hard disk drives, including those of different interface types.

In one embodiment of the invention, storage blade 300 may contain other processors and devices that provide Redundant Array of Independent Discs (RAID) functionality, and may interconnect with the PCI bus of the corresponding server blades 110. In one embodiment of the invention, for example, the RAID system may comprise a plurality of hard disk drives configured with a controller 330. Controller 330 may comprise, for example, an integrated RAID controller such as the GSU31 RAID controller made by Intel Corporation. The GSU31 RAID controller is a PCI-based, single-channel Ultra-160 SCSI RAID controller that utilizes the i960® RS I/O processor made by Intel Corporation. Further, the storage system may be a RAID level five system. The term "level 5" may refer to a RAID system that may provide, for example, data striping at the byte level and also stripe error correction information. The term "data striping" may refer to spreading data from a file across multiple hard drives thereby improving file access times.

Storage blade 300 may also have a memory 335. Memory 335 may comprise any machine-readable media, such as ROM, RAM, synchronous RAM-(SRAM), synchronous dynamic RAM (SDRAM), and so forth. Memory 335 may store computer program instructions to be executed by a processor, such as controller 330. In one embodiment of the invention, controller 330 may include its own memory and thereby allow for the omission of memory 335. Another example of a controller 330 may be, for example, a controller using the i310 XScale™ processor made by Intel Corporation.

Logically, storage blade 300 may transfer information on the secondary IDE channels of server blades 110. Hard disk drives 310 and 320 may be configured for Cable Select (CSEL), a feature that allows CSEL configured hard disk drives to automatically assume Master/Slave (Drive 0/Drive 1) identities when cabled to the appropriate headers on the storage blade 180. The CSEL feature may be built into the printed circuit board (PCB), for example.

According to one embodiment of the invention, a midplane input/output (I/O) connector 350 of storage blade 300 may be a CompactPCI form factor interface adapted for connection with a blade interface of midplane 170. Similarly, server blades 110 may include midplane connectors 360, 370 and 380. These connectors may be CompactPCI form factor interfaces adapted for connection with a blade interface of midplane 170. Midplane I/O connectors 340 and 360 of storage blade 300 and server blade 110, respectively, may include a secondary IDE channel 340 for communication between storage blade 300 and server blades 110 through midplane 170, or alternatively, may make use of a CompactPCI bus.

In one embodiment of the invention, storage blade 300 may be a modular component of a modular server system, such as a storage blade. The embodiments of the invention, however, are not limited in this context. For example, in another embodiment of the invention, a storage system to provision the server blades with the appropriate OS may be implemented in other parts of the modular server system, such as midplane 170 or the modular server system chassis (not shown). In another embodiment of the invention, the storage system may be external to the modular server system as part of a connected device, such as a SAN or a NAS system. In this case, the external storage system may be accessible by the modular server system via a conventional high-speed connection.

Figure 4:
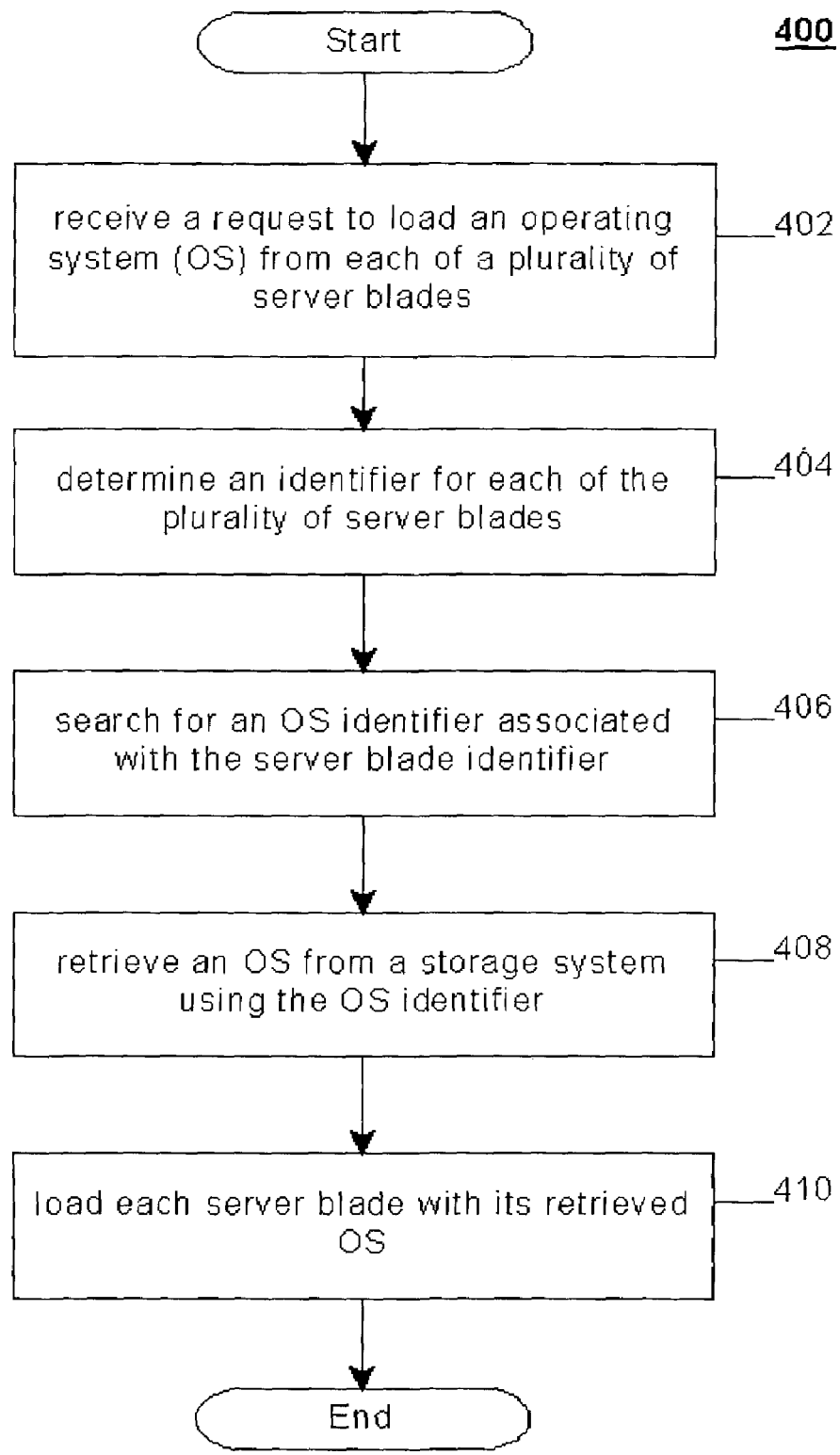
FIG. 4 illustrates a first block flow diagram of programming logic that may be implemented by a provisioning module in accordance with one embodiment of the invention.
Figure 5:
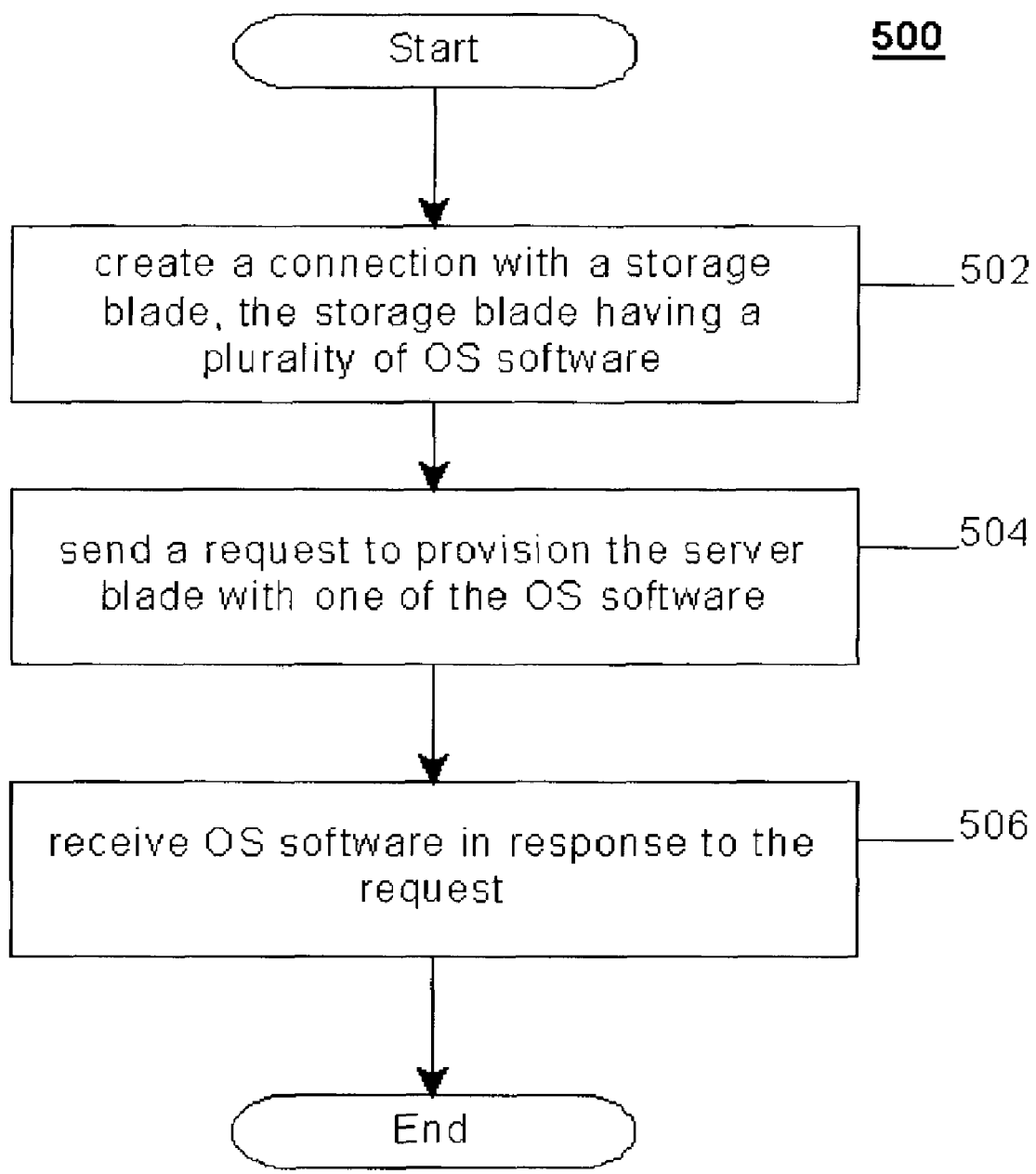
FIG. 5 illustrates a second block flow diagram of programming logic that may be implemented by a provisioning module in accordance with one embodiment of the invention.

The operations of systems 100, 200 and 300 may be further described with reference to FIGS. 4-5 and accompanying examples. Although FIGS. 4-5 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 4 is a first block flow diagram of the programming logic performed by a provisioning module in accordance with one embodiment of the invention. In one embodiment of the invention, the provisioning module may refer to the software and/or hardware used to implement the functionality for server blade software provisioning as described herein. In one embodiment of the invention, the provisioning module may be implemented as part of storage blade 180.

FIG. 4 illustrates a processing logic 400 to provision a plurality of servers. A request to load an OS from each of a plurality of server blades may be received at block 402. In one embodiment of the invention, this may be accomplished by creating a connection between each server blade and a storage system having the OS, and receiving the request over the connection. An identifier may be determined for each of a plurality of server blades at block 404. In one embodiment of the invention, this determination may be performed by receiving a provisioning request from a server, with the provisioning request including a server blade identifier. A search may be initiated for an OS identifier associated with the server blade identifier at block 406. OS software may be retrieved from the storage system using the OS identifier at block 408. Each server blade is then loaded with its retrieved OS at block 410.

A search for an OS identifier may be performed using an OS identifier list. The OS identifier list may be a table having an entry for a server blade identifier for each server blade that is part of a modular server system. Each server blade identifier may be, for example, a dynamic host configuration protocol (DHCP) address, a MAC address, a port number, or some other unique identifier for a server blade. Each server blade identifier may have an associated OS identifier. The OS identifier identifies the OS for each server blade. For example, the OS identifier may be a file name or file address for the particular OS software. Whenever a server blade identifier is received, the OS identifier list may be searched using the server blade identifier. The server blade identifier may have a pointer or address to the OS identifier. The OS identifier may be retrieved and used to load the OS software to the server blade.

FIG. 5 is a second block flow diagram of the programming logic performed by a provisioning module in accordance with one embodiment of the invention. In one embodiment of the invention, the provisioning module may be implemented as part of server blades 110.

FIG. 5 illustrates a processing logic 500 to provision a plurality of servers. A connection with a storage blade may be created at block 502. The storage blade may store a plurality of OS software. A request may be sent to provision the server blade with one of the plurality of OS software at block 504. The OS software may be received in response to the request at block 506.

In one embodiment of the invention the request may include a server blade identifier and an OS identifier. The request may be received at the storage blade. An OS for the server blade may be identified using the OS identifier. The OS may be sent to the server blade over the connection. Once received by the server blade, the server blade may store the OS software in memory and execute the OS software.

The operation of systems 100, 200 and 300, and the processing logic shown in FIGS. 4 and 5, may be better understood by way of example. A modular server system such as system 100 is powered up. Each server blade loads and executes instructions from its basic input/output system (BIOS), which is typically stored in firmware such as flash memory 212. Part of the BIOS initialization process includes a boot loading protocol, which includes a list of scheduled tasks to boot the server blade. The term "boot" as used herein may refer to loading software. The schedule may comprise a sequence, for example, of locations the server blade is to look for its OS software. The sequence may include firmware, dynamic memory such as DRAM 210, and a network device.

The BIOS may be modified using the principles included herein to establish a network connection with a storage system as part of its boot loader protocol. For example, server blade 110 may establish a network connection with storage blade 180 via midplane 170. The network connection may comprise, for example, an Ethernet connection. Server blade may send a request for its OS software to storage blade 180. The OS software may be any conventional OS software, such as the OS software made by Microsoft Corporation or Sun Microsystems Incorporated. In one embodiment of the invention, the request may include a server blade identifier for server blade 110, such as a DHCP address. In another embodiment of the invention, storage blade 180 may locate and retrieve the DHCP address from a DHCP server or network OS for modular server system 100.

Once storage blade 180 receives the request, a provisioning module of storage blade 180 may begin the provisioning process for server blade 110. The provisioning module may be implemented as software and stored in memory, such as memory 335. A processor such as controller 335 may receive and execute program instructions from memory 335, for example.

The provisioning module may either retrieve the DHCP address from the request itself, or from an external source such the DHCP server or network OS. The provisioning module may access the OS identifier list and retrieve an OS identifier associated with the server blade identifier. The provisioning module may then use the OS identifier to retrieve the appropriate OS software from the storage system, and send the OS software to the requesting server blade 110.

Once server blade 110 receives the OS software, it may store the OS software in its local memory, such as DRAM 210. The server blade 110 may then execute the OS software and begin execution of the OS.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A storage blade, comprising:
   a hard disk drive;
   a hard disk drive controller; and
   a provisioning module to provision a plurality of server blades with OS software stored on said hard disk drive for execution by said server blades, each server blade being implemented as a single board having a server blade identifier associated with an OS identifier, the OS identifier identifying the OS software to be provisioned on each server blade, the server blade comprising a connection module to create a connection with a server blade, an identification module to determine the identifier for said server blade, a search module to retrieve the OS identifier associated with said server blade identifier, and a loading module to retrieve an OS associated with said OS identifier and load said identified server blade with said OS;
   wherein said storage blade is implemented as a single board.

2. The storage blade of claim 1, wherein said hard disk drive is one of a plurality of hard disk drives configured as a redundant array of independent discs (RAID) system.

3. The storage blade of claim 2, wherein said hard disk drive controller is a RAID controller.

4. The storage blade of claim 3, wherein said RAID system is a level five RAID system.

5. The storage blade of claim 4, wherein said RAID system includes a compact disc read only memory (CD-ROM).

* * * * *